EMERGENCY ASSISTANCE RADIO SIGNALING SYSTEM

INVENTORS
GEORGE R. DENNY
DONALD L. STONER
BY
Bonard F. Brown
ATTORNEY

INVENTORS
GEORGE R. DENNY
DONALD L. STONER
BY
Bonord I. Brown
ATTORNEY

United States Patent Office 3,290,597

Patented Dec. 6, 1966

3,290,597

EMERGENCY ASSISTANCE RADIO SIGNALING SYSTEM

George R. Denny, Azusa, and Donald L. Stoner, Upland, Calif., assignors to Robert Berlin, La Verne, Calif., and Gilbert F. Manley, Covina, Calif.

Filed Dec. 8, 1965, Ser. No. 517,168
7 Claims. (Cl. 325—64)

The present application is a continuation-in-part of the applications of George R. Denny, Serial No. 238,236, filed November 16, 1962, Serial No. 444,933, filed March 24, 1965, both now abandoned.

The present invention relates generally to an emergency radio signaling system for use by individuals, such as law enforcement officers, in need of assistance to communicate an emergency signal to a central station; more particularly, the invention relates to an emergency radio signaling system for use by such individuals, wherein a triggering signal is initiated by portable transmitter means on an individual to initiate transmission of a predetermined output by equipment on the individual's mobile unit in his vicinity to a central station.

Law enforcement officers, security guards, and other individuals who utilize mobile units carrying radio equipment, frequently become involved in emergency situations wherein they cannot directly utilize the radio equipment in their mobile units or vehicles to call for assistance. Such emergency situations arise when such individuals are temporarily away from their vehicles and are subject to attack, restraint or other situations which prevent use of the radio equipment in their vehicles.

The embodiments of the invention herein shown and described relate to emergency radio signaling systems adapted for use by law enforcement officers in cooperation with radio equipment mounted in their mobile units or patrol cars and at a central station, such as a police headquarters. Preferred embodiments of the system each include a portable transmitter adapted to be carried by an individual, radio receiving and transmitting equipment in the individual's mobile unit or patrol car, control means connected with the receiving and transmitting equipment for switching the equipment from "receive" to "transmit" in response to a triggering signal from the portable transmitter, means responsive to this control means to produce a predetermined radio signal or audio output for transmission by the transmitting equipment, and central station radio equipment for receiving this transmission. The system thereby provides for the identification of the particular individual summoning assistance by his portable transmitter.

In one preferred embodiment of the invention, the predetermined output transmitted by the transmitting equipment is provided by a speech recorder, and the output comprises a pre-recorded message. The transmitted message is received by the radio equipment at the central station and provides identification of the individual who is summoning assistance, as well as other needed information. In another embodiment, the predetermined output transmitted from the mobile unit transmitting equipment comprises a characteristic emergency signal provided by an oscillator which is responsive to the control means. This signal, which is characteristic of the particular transmitting equipment, is received by equipment and the central station, which equipment discriminates and identifies the characteristic signal.

In the operation of the system, the individual switches on his portable transmitter, which is adapted to be readily switched on by movement of a portion of his body or manually, thereby generating a triggering signal. In response to the triggering signal, the control unit in the patrol car automatically switches the transmitting and receiving equipment to transmitting operation by means of activating replays, and energizes means which produce the predetermined output for transmission. As mentioned above, this output may preferably be a pre-recorded voice message provided by a speech recorder. It may be a characteristic emergency signal provided by an oscillator responsive to the control means. In systems utilizing a pre-recorded message, no special equipment is required at the central station to identify individual summoning assistance. In systems utilizing a characteristic signal, provided by the oscillator, to identify the particular mobile unit, the central station equipment includes control equipment including a plurality of tuned circuits which are responsive to respective characteristic emergency signals from respective patrol cars, one of which tuned circuits is responsive to the characteristic signal from the particular patrol car of the individual who operated the portable transmitter. In response to the characteristic signal, the tuned circuit actuates a tuned relay, or equivalent tuned switching means, which then energizes a lamp or other signal means, as on a control panel, which identifies the individual who signalled for emergency assistance.

Utilizing the system of the invention, any of a number of law enforcement officers may readily initiate a triggering signal by means of his portable transmitter, thereby causing the transmission from his mobile unit or patrol car of an identifiable transmission to the central station, thereby identifying the particular individual or patrol car in need of assistance.

It is therefore an object of the present invention to provide a new and improved emergency assistance radio signaling system.

An object of the invention is the provision of an emergency radio signaling system for use by an individual, such as a law enforcement officer, to communicate for assistance from his person through mobile equipment in his vicinity to a central station.

It is an object of the invention to provide an emergency assistance radio signaling system according to the foregoing objects, wherein a triggering signal is initiated by portable transmitter means on the individual's person to initiate an emergency transmission by equipment on a mobile unit in his vicinity to a central station.

An object of the present invention is the provision of an emergency radio signaling system in accordance with the foregoing objects, wherein speech recorder means reproduce a pre-recorded emergency message for transmission by the mobile equipment to the central station.

An object of the invention is the provision of an emergency assistance radio signaling system in accordance with certain of the foregoing objects, for use by persons in circumstances of distress, wherein any one of respective transmitters carried by respective individuals triggers equipment on an individual's mobile unit in his vicinity, thereby transmitting a respective characteristic emergency signal to a central station provided with equipment which monitors and discriminates to identify the individual in distress.

An object of this invention is to provide an emergency assistance radio signaling system according to the foregoing objects, wherein the system is readily integrated with conventional law enforcement communications equipment by the integration of control components in units which are readily connectable with conventional communications equipment used in mobile units and central stations, such as the equipment of law enforcement organizations.

An object of the invention is the provision of an emergency assistance radio signaling system in accordance with the foregoing objects, wherein a portable transmitter carried by an individual for use in the system is adapted to be readily switched on for transmission manually or by movement of a portion of the individual's body.

Other objects, features and advantages of the present invention will become apparent to those versed in the art from a consideration of the following description, the appended claims and the accompanying drawings, in which:

Figures 1, 2, 6:
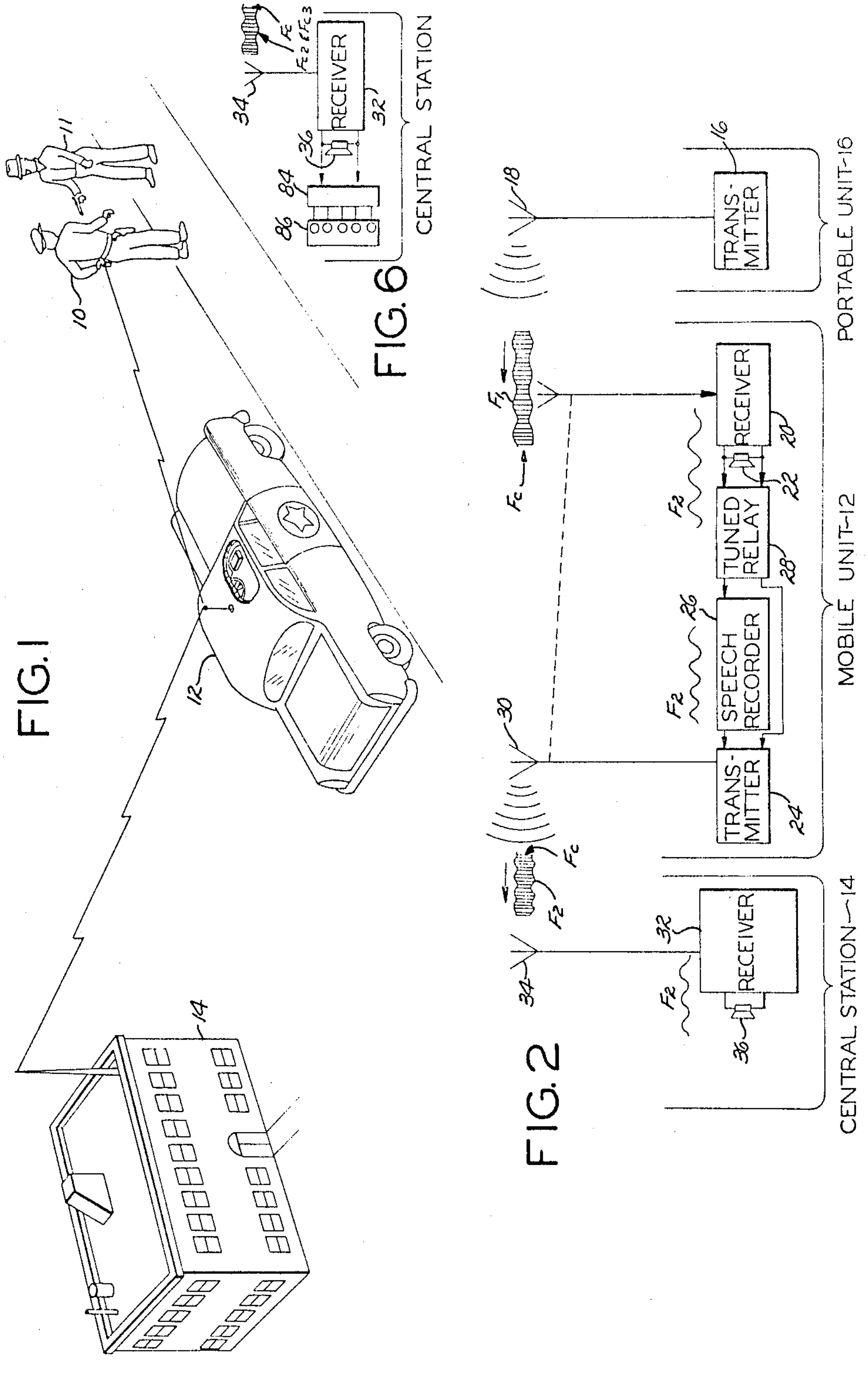
FIGURE 1 is a diagrammatic perspective view illustrating generally the application and utility of a preferred embodiment of the present invention.
FIGURE 2 is a block diagram of a preferred embodiment of the system of the invention, wherein features of its operation are indicated.
FIGURE 6 is a block diagram illustrating an embodiment of the system of the invention.
Figures 3, 4, 5:
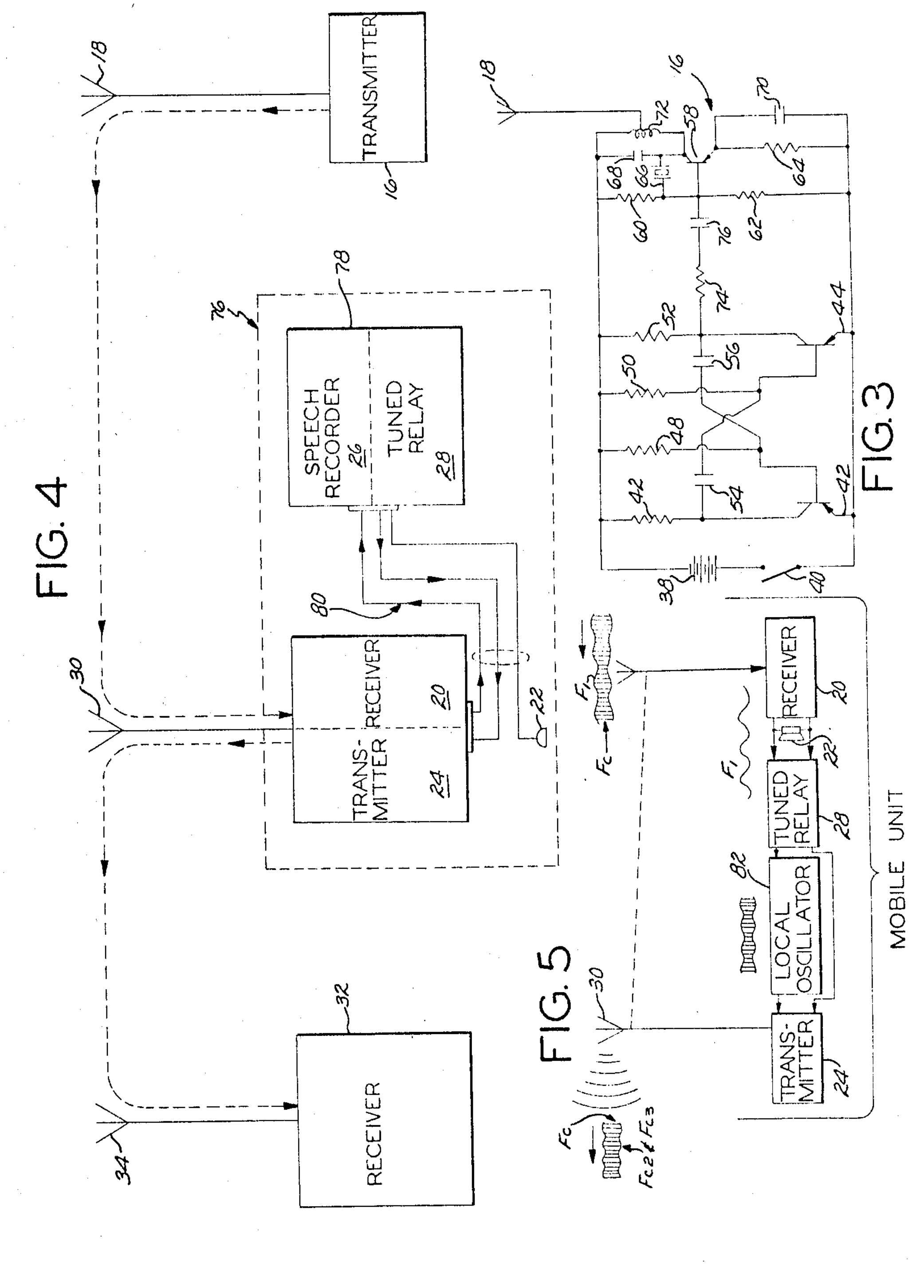
FIGURE 3 is a schematic diagram showing the electrical circuitry of an exemplary form of portable personal transmitter utilized with the invention.
FIGURE 4 is a block diagram showing a preferred manner of assembling or integrating the system of the invention with conventional equipment.
FIGURE 5 is a block diagram illustrating an embodiment of the system of the invention.
Figure 10:
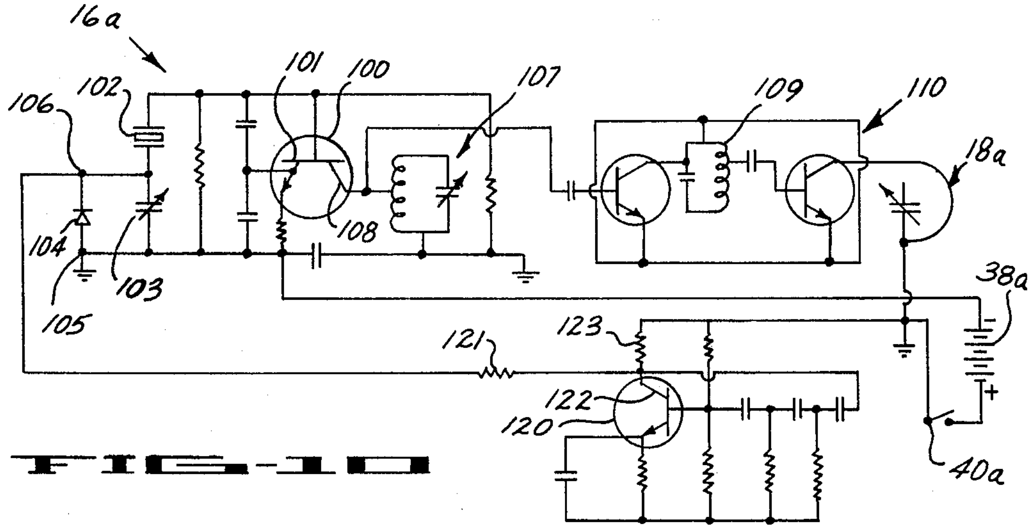
FIGURE 10 is a schematic circuit diagram of another form of oscillator and transmitter circuit for generating the coded signal transmission as indicated in FIGURE 7 and related to the transmitter shown in FIGURE 3.

Referring to the drawings, FIGURE 1 illustrates the utilization of a preferred embodiment of the invention. A law enforcement officer 10, being menaced by an armed criminal, is outside and at a distance from his vehicle or patrol car 12, and therefore cannot directly operate the radio equipment in the vehicle to summon assistance by communicating with a central station or police headquarters 14. To summon assistance, the officer switches on a portable transmitter 16, which is provided with a switch 40 as shown in FIGURES 3 and 10, which is readily operable, as by a particular movement of a portion of the officer's body or which is manually operable. The portable transmitter 16 broadcasts a triggering signal to the radio equipment mounted in the vehicle 12, which equipment thereupon transmits a predetermined emergency message or signal to the central station 14, as hereinafter described in detail.

Figure 9:
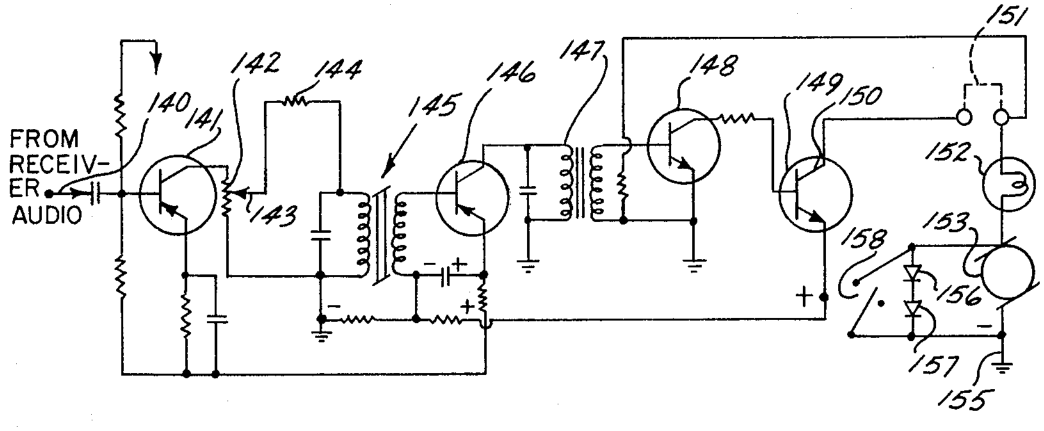
FIGURE 9 is a detailed schematic circuit diagram of a frequency sensitive network which may be employed in the decoder of FIGURE 8.

FIGURE 2 illustrates diagrammatically the components and certain operating characteristics of the preferred form of the emergency signaling system. The small battery-powered portable transmitter 16, which is carried on the person of an individual, has a transmitting antenna 18 (or **18*a* as shown in FIGURE 10) and transmits a carrier frequency $F_c$ which is modulated with an audio frequency $F_1$. The radio equipment in the vehicle 12 includes a receiver 20 which is tuned to the same frequency as portable transmitter 16, and which is connected with a speaker 22. Control equipment of the invention includes a tuned circuit such as shown in FIGURE 9 connected to the output of receiver 20, which circuit, in response to the incoming triggering signal from the portable transmitter, switches the receiving and transmitting equipment or transceiver in the vehicle from receiving operation to transmitting operation, activating the transmitter 24. Simultaneously, the tuned circuit energizes a speech recorder 26, as described in further detail below and shown particularly in FIGURE 9, the output of which is fed into transmitter 24**. This output is a pre-recorded voice message, which may either be a coded or identifying message recorded at an earlier time, or a particular message giving the particular individual's emergency circumstances, in the manner hereinafter discussed.

The receiver 20 demodulates the carrier frequency $F_c$ of the emergency signal from the portable transmitter, and the demodulated signal $F_1$ is gated through the amplifier of the receiver to a tuned relay 28, which may be a tuned circuit or a transistorized switching element, which circuit is a part of the control equipment. The transmitter 24 broadcasts by means of its antenna 30 the prerecorded message to the central station 14 (FIGURE 1). Alternatively, as shown in FIGURE 9, a tuned amplifier circuit resonant at the frequency of the demodulated signal may be used.

The equipment at the headquarters or central station 14 includes receiving equipment 32 which is provided with a receiving antenna 34 and which is connected to output means, such as a speaker 36.

FIGURE 3 schematically illustrates the circuitry of a preferred form of the portable transmitter 16 which is utilized in accordance with the invention. As hereinbefore mentioned, the transmitter is of such a size and configuration that it is conveniently carried on the person of the user, and its operation is initiated in a convenient and ready manner, either manually or by movement or expansion of a portion of the body of the user, as by mechanical switch means 40 shown in FIGURE 3. The transmitter is powered by a battery 38, and is activated by switch 40. A free running multivibrator or oscillator is provided by the circuitry which includes the transistors 42, 44, the associated resistors 46, 48, 50, 52 and the capacitors 54, 56, which oscillator operates in the audio frequency range. A Colpitts oscillator, which operates in the radio frequency range, is provided by the connection of transistor 58, resistors 60, 62, 64, the crystal 66, the capacitors 68, 70, and the inductance 72. It will be understood that the audio frequency oscillator and the radio frequency oscillator thus provided are well known to those versed in the art. The multivibrator audio frequency oscillator is coupled to the radio frequency oscillator through resistor 74 and capacitor 76. The radio frequency oscillator is therefore modulated by the audio frequency oscillator. The modulated output of the radio frequency oscillator is coupled to the antenna 18 of the portable transmitter from a tap on the inductor 72, which is a part of a parallel tuned collector tank circuit which includes the capacitor 68.

In FIGURE 10 another form of transmitter 16 is shown at **16*a* in which a crystal-controlled oscillator transistor 100 is employed and in which a novel means of frequency-modulating the oscillator is shown and can be described as follows: From base 101 of transistor oscillator 100 a quartz crystal unit 102 is connected to the parallel combination of a variable capacitor 103 and a diode device 104. The other junction of the parallel combination is connected to ground at 105. Diode 104 is of a type which acts as a capacitor. The capacitance of the capacitor/diode 104 can be varied by a voltage applied thereto. Thus, for any setting of capacitor 103 and fixed voltage applied between junction 106 and ground at 105 the frequency of oscillator 100 as controlled by crystal 102 will be established at some value $F_0$. The frequency $F_0$ of oscillator 100 will be different for different settings of capacitor 103. Any varying voltage applied to diode 104 between points 106 and 105 will result in corresponding variations in frequency of oscillator 100 about a center frequency $F_0$ set by crystal 102 and the setting of capacitor 103. Resonant circuit 107 in the collector 108 of transistor oscillator 100 may adjust to some multiple of $F_0$ as $3 \times F_0$ to triple the output thereof over the crystal frequency as set by the capacitor 103 and varied by voltages applied to diode 104** as hereinbefore described.

Further multiplication of the frequency derived from circuit 107 can be accomplished in the multiplier and output circuit block 110 wherein in simplified schematic form the output circuits of transmitter 16 are shown. In particular, the final amplifier/multiplier tank circuit 18*a* is the antenna of the embodiment of the transmiter 16*a* shown in FIGURE 10. Multiplier circuits as hereinabove described are generally known in the art.

Transistor 120 is connected in a phase shift audio oscillator configuration of known design. A resistor 121 is coupled between collector 122 of transistor 120 and junction 106 of diode 104, capacitor 103 and crystal 102. The collector load resistor 123 of transistor 120 can be seen to be in parallel with the series combination of resistor 121 and diode/capacitor 104 so that any variation in the voltage across resistor 123 will produce a proportional voltage variation at junction 106 with respect to ground at 105. As hereinabove described voltage variations applied to diode 104 result in a corresponding capacity changes in diode 104 to produce a corresponding frequency variation in oscillator 100 about a crystal controlled center frequency established by capacitor 103 and crystal 102.

The deviation in frequency of oscillator 100 will be multiplied by the overall multiplication factor achieved with multiplier chain 110 and the tripled output of tuned circuit 107.

Thus, the phase shift oscillator output signal appearing across resistor 123 will frequency modulate transmitter oscillator 100 and produce a corresponding frequency modulated output of relatively wide deviation at antenna 18*a* each tune switch 40*a* is operated (closed) as hereinbefore described.

A preferred arrangement of components and equipment according to the invention in relation to conventional vehicle radio equipment and central station equipment is illustrated in FIGURE 4. The overall radio equipment in the mobile unit or patrol car is indicated at 76. A control unit 78, preferably embodied in a unitary housing, incorporates the speech recorder 26 and the tuned relay 28. The unit 78 is connected with the transmitter 24 and the receiver 20 by means of an electrical connector or cable 80, and is connected to the speaker 22 by an electrical connector, which is preferably a part of the cable. The integration of these components into the control unit facilitates the convenient coupling and integration of components of the system of the invention with conventional radio equipment of the vehicles and central stations of law enforcement organizations. The tuned relay receives and discriminates the incoming triggering signal from the portable transmitter 16 and operates the switching element for switching the radio equipment in the vehicle from "receive" to "transmit." The tuned relay also energizes the speech recorder to effect transmission of the pre-recorded emergency voice message.

Figure 7:
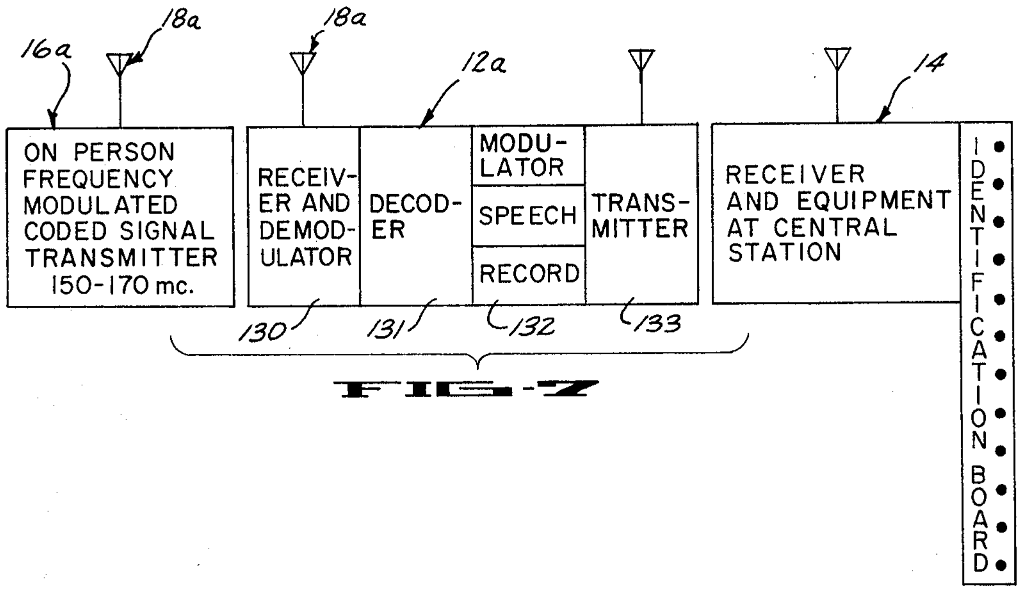
FIGURE 7 is a block diagram of the system of the invention incorporating specific details of a form of the invention involving a system similar to that shown in FIGURE 5.

Referring now to FIGURE 7 it may be seen that the system of this invention may be implemented according to the blocks shown therein as transmitter 16*a*, on the person frequency modulated transmitter of a coded signal. As described above, this transmitter (shown in more detail in FIGURE 10) can generate an output at about 12 times the normal crystal frequency. This is achieved by the tripler action of circuit 108 in FIGURE 10 and doubling in each of the tuned circuits 109 and 18*a* in multiplier 110. Thus a crystal frequency of 12.5 mc. would produce an output at 150 mc. This signal is frequency modulated at the frequency of phase shift oscillator 120.

The equipment in a patrol car 12*a* shown in FIGURE 7 includes a receiver 130 responsive to transmitter 16*a* to demodulate the frequency modulated signal and recover a signal corresponding to the frequency of phase shift oscillator 120. Such demodulating equipment is well known in the art.

Figure 8:
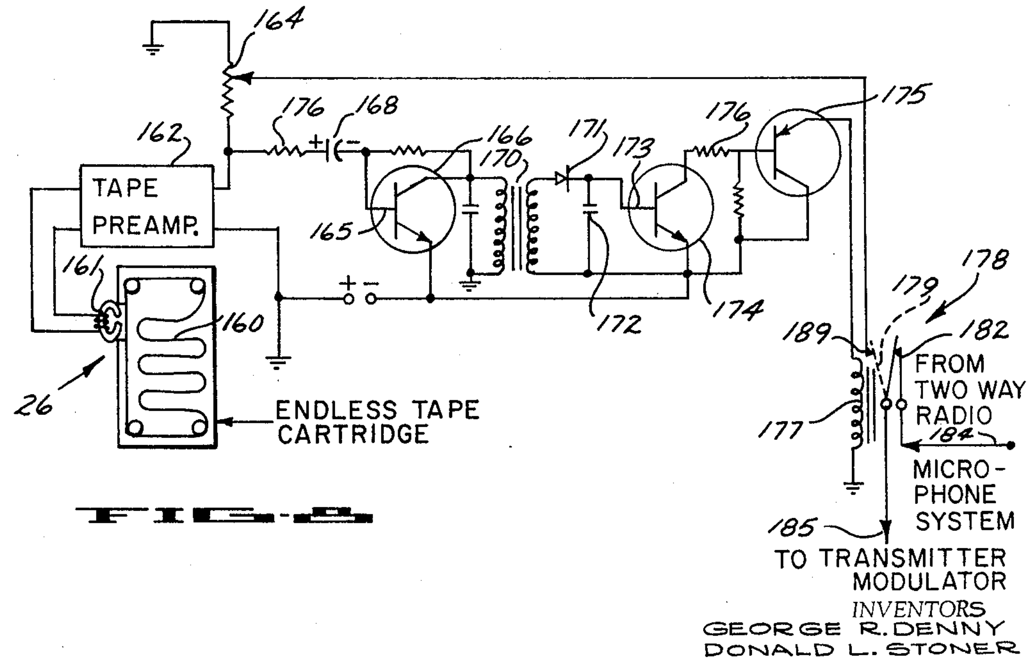
FIGURE 8 is a partially schematic and partially block circuit diagram of the decoder portion of FIGURE 7.

The demodulated signal is applied to a decoder 131 (further shown in FIGURE 9) and the modulator 132 of the transmitter 133 is made responsive by the decoder to either the normal speech equipment therein or the recorded signal from an endless loop tape cartridge as illustrated in FIGURE 8.

At the central station 14 the signals from transmitter 133 are received and processed as hereinbefore described.

The circuit schematic diagram shown in FIGURE 9 corresponds to the decoder 131 shown in FIGURE 7. In the circuit, a signal from the receiver 130 (the demonstrated signal) appears at input terminal 140 and includes any noise plus the oscillation frequency generated by phase-shift oscillator 120. This signal is amplified by conventional transistor limiter-amplifier 141, the output load resistor 142 of which is a potentiometer, by which a proportion of the output of amplifier 141 may be selected at arm 143 of control 142. This selected output signal is applied through a limiting resistor 144 to a resonant transformer assembly 145 which selects only the signal frequency of the phase shift oscillator to which it is resonant and excludes any other signals or noise. This selected signal frequency is further amplified in conventional amplifier 146 and applied through output transformer 147 connected to transistor amplifier 146 to a motor and lamp driver circuit including transistors 148 and 149, connected in a direct-coupled configuration. In the collector circuit 150 of transistor 149 a jumpered connection 151 leads to a lamp 152 and a motor 153, the motor 153 returning to ground at 155. Diodes 156–157 discharge transients across motor 153 by conducting on reverse polarity pulses which may result from the start and stop action of motor 153. A switch 158 is connected across motor 153 to short it and so that test signals will only light lamp 152 and not operate motor 153.

When the signal of transmitter 16*a* is demodulated and appears at 140 the resulting single frequency signal applied at transistor 149 is filtered by the action of tuned transformer 145 and if switch 158 is open starts motor 153 turning. Motor 153 is the capstan motor of a conventional endless loop magnetic tape cartridge reproducing system such as shown at 26 in FIGURE 8. While not shown, tape cartridge reproducer 26 is such that, once its operation is initiated, it continues in operation until the entire tape loop has been transported through the player, at which time it is shut off. Thus a single short transmission starts the recorder which continues to operate through its cycle until a complete recorded message has been passed through the transport mechanism.

Referring now to FIGURE 8, the recorded message on the tape 160 in cartridge 26 is picked up by playback head 161 and applied to a preamplifier 162 of conventional design. This output 163 of amplifier 162 provides an amplified counterpart of the signal (a pre-recorded message) on tape 160, across a potentiometer 164 and onto the base 165 of a transistor output amplifier 166 through resistor 167 and capacitor 168. The appearance of signals from output 163 at transistor 166 results in a signal on transformer 170 which in turn applies the signal to diode 171. Diode 171 rectifies the signal and charges capacitor 172 to produce a positive polarity signal on base 173 of transistor 174. Transistor 174 is directly coupled to transistor 175 through a resistor 176 so that transistor 175 becomes conductive to apply current through relay coil 177. Relay contacts 178 are normally open. Upon application of current to coil 177 contacts 179–180 are closed to apply the signal from control 164 to the modulator (at 185) of transmitter 133 as previously described. Upon the termination of any signals from tape 160, capacitor 172 discharges and transistors 174, 175 are nonconductive to release relay contacts 178 to the normally deenergized condition closing contacts 181 so that the transmitter modulator 185 may receive the normal speech audio from the two-way radio microphone system 184.

The utilization of the assistance radio signaling system will be understood from the foregoing description. Prior to the use of the system to transmit an emergency message for assistance, a message is pre-recorded on the speech recorder which is typically a magnetic tape recorder.

This message may be recorded at a time prior to the indication of any emergency, and may typically be such a message as "Car 79—Code 3." An individual, such as a police officer, may pre-record an emergency message immediately prior to leaving his vehicle under circumstances wherein an emergency may arise. For example such a message might be: "10:42, officer John Doe—saw three men lurking inside fence at warehouse at 2434 Riverside Street—leaving car to investigate." Upon the arising of an emergency, wherein assistance is required such as being restrained or attacked, the individual or officer can effect transmission from his portable transmitter by an appropriate body movement or manually, thereby effecting transmission from the radio equipment in his mobile unit of the prerecorded emergency message to the central headquarters. From the message, personnel at the central station or headquarters are provided with information necessary for the dispatch of assistance.

FIGURES 5 and 6 are diagrammatic illustrations of the components and operating characteristics of another embodiment of the emergency radio signaling system of the invention. As indicated in these figures, this embodiment differs from the embodiment illustrated in FIGURES 2 and 4 in that a local oscillator 82 is substituted for the speech recorder 26 of the other embodiment, and in that a set of tuned circuits 84 and an indicating panel 86 are provided at the central station. When an incoming triggering signal is received from the portable transmitter (FIGURES 2 and 3), the tuned circuit (described in relation to the embodiment shown in FIGURE 2) switches the equipment in the vehicle to transmitting operation, and simultaneously energizes the local oscillator 82, the output of which is fed into the transmitter 24. Receiver 20 demodulates the carrier frequency $F_c$ of the emergency signal from the portable transmitter, and the demodulated signal $F_1$ is gated through the amplifier of the receiver to the tuned relay 28, which is a part of the control equipment of the invention. Transmitter 24 broadcasts to headquarters or central station 14 (FIGURE 1) an emergency signal comprising the carrier signal $F_c$ on which is superimposed a signal $F_3$ generated by the local oscillator 82. The duration of the transmission of this emergency signal is preferably short and is preferably limited by an internal timing circuit within the control equipment.

The receiving equipment 32 at the central station 14, in addition to the receiving antenna 34 and the speaker 36 hereinbefore described, includes components which include a plurality or set of tuned circuits 84, which constitute means for discriminating and identifying the characteristic emergency signal transmitted by the particular transmitter 24 carried by the particular vehicle 12. The set of tuned circuits 84 is electrically connected with an indicating panel 86, which is equipped with indicating means, preferably signal lamps, and which may also include such indicating means as audible signal devices. A particular one of the tuned circuits 84, in response to the incoming emergency signal, selectively energizes one of the indicating lamps or devices. The central station equipment thus discriminates and identifies the characteristic emergency signal from the particular vehicle of the individual who is summoning assistance by means of his portable transmitter. Personnel at the central station are thereby enabled to dispatch assistance.

The preferred arrangement of components of the system of the invention in relation to conventional equipment, illustrated in FIGURE 4, is also applicable to the embodiment shown in FIGURES 5 and 6. The unitary housing or control unit 78, instead of embodying the speech recorder 26, incorporates the decoding stage and the oscillator 82. The decoding stage includes the tuned relay 28, which receives and discriminates the incoming triggering signal from the portable transmitter 16, and operates the switching element for switching the radio equipment in the vehicle from "receive" to "transmit." As hereinbefore mentioned, tuned relay 28 may also energize a time cycling unit (not shown) which governs the time duration of the emergency signal broadcast from the vehicle transmitter 24. The tuned relay in the coding programming stage also energizes the local oscillator 82, thereby effecting transmission of a characteristic emergency signal from the transmitter 24, this signal serving to identify the particular transmitter and vehicle.

In addition to fulfilling the requirements of the particular adaptation and embodiment hereinbefore described, the invention is readily adaptable to other utilizations such as by plant security guards, military personnel on guard duty, and by bank personnel to trigger robbery alarms.

From the foregoing description, those versed in the art will appreciate that the present invention achieves the objects and realizes the advantages hereinbefore mentioned, and that additional advantages are apparent from the description.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventors claim:

1. An automatic emergency assistance-calling communications system comprising in combination:

a first radio transmitter of such proportions and configuration as to be concealable on one's person, said first transmitter including a frequency-controlled, radio-frequency signal generator, a multivibrator audio-frequency signal generator, electric circuit means coupling said audio-frequency generator to said radio-frequency generator for modulation of said radio-frequency generator with audio frequency signals of predetermined character, and switch means, coupled to said transmitter, and adapted to be manually operative for actuating said first radio transmitter when an emergency threatens the one who maintains said transmitter on his person;

a first radio receiver, adapted to be responsive to the modulated signals transmitted by said first radio transmitter, and including circuit means therein adapted to receive and demodulate the modulated radio-frequency signals transmitted by said first transmitter and for deriving therefrom a switching control signal;

a second radio transmitter having therein a first source of modulating signals in the form of a speech modulator and a second source of modulating signals in the form of a predetermined code signal generator for identifying the particular second radio frequency transmitter by the predetermined code signal, and switching circuit means coupled with said first receiver and adapted to be responsive to said switching control signals to transfer said second transmitter from said speech modulation source to said second source of modulating signals for transmitting a carrier signal modulated by said predetermined code signal; and a second radio receiver located in a central station and including therein a characteristic display indicator adapted to be responsive to said predetermined code signal modulating the carrier of said second transmitter and being received by said second radio receiver, said display indicator being further adapted to display an identifying indication characteristic of the particular predetermined code signal being received from that particular second transmitter, said display being an indication of the need for assistance and the location of the one needing assistance whereupon immediate aid can be dispatched from said central station.

2. An automatic emergency assistance calling communications system comprising in combination:

a first radio transmitter of such proportions and configuration as to be concealable on one's person, said first transmitter including a frequency-controlled, radio-frequency signal generator, a phase-shift audio-frequency signal generator, electric circuit means coupling said audio-frequency generator to said radio-frequency generator for modulation of said radio-frequency generator with audio frequency signals of predetermined character, and switch means coupled to said transmitter adapted to be manually operative for actuating said first radio transmitter when an emergency threatens the one who maintains said transmitter on his person;

a first radio receiver adapted to be responsive to said first radio transmitter and including circuit means therein adapted to receive and demodulate the modulated radio-frequency signals transmitted by said first transmitter;

a second radio transmitter having therein a first source of modulating signals in the form of a speech modulator and a second source of modulating signals in the form of a pre-recorded message signal generator for identifying the particular second radio frequency transmitter and its location by said pre-recorded message signal, and switching circuit means being responsive to said demodulated signals to transfer said second transmitter from said speech modulation source to said second source of modulating signals for transmitting a carrier signal modulated by said pre-recorded message signal; and a second radio receiver located in a central station and including therein a characteristic output device adapted to be responsive to said pre-recorded message signal modulating said second transmitter and being received by said second radio receiver, said message signal identifying that particular second transmitter and providing an indication of the need for assistance whereupon immediate aid can be dispatched from said central station.

3. An emergency assistance calling communications system comprising in combination:

a first radio transmitter of such proportions and configuration as to be concealable on one's person, said first transmitter including a radio-frequency signal generator, a control signal generator, electric circuit means coupling said control generator to said radio-frequency generator for modulation of said radio-frequency generator with control signals of predetermined character, and switch means coupled to said transmitter and adapted to be manually operative for actuating said first radio transmitter when an emergency threatens the one who maintains said transmitter on his person;

a first radio receiver adapted to be responsive to said first radio transmitter and including circuit means therein adapted to receive and demodulate the modulated radio-frequency signals transmitted by said first transmitter and to derive therefrom the control signal;

a second radio transmitter having therein a first source of modulating signals in the form of a speech modulator and a second source of modulating signals in the form of a characteristic emergency signal generator for identifying the particular second radio frequency transmitter by said emergency signal, and switching circuit means being responsive to said control signal to transfer said second transmitter from said speech modulation source to said second source of modulating signals for transmitting a carrier signal modulated by said emergency signal; and a second radio receiver located in a central station and including therein a characteristic output indicator adapted to be responsive to said emergency signal said display indicator being further adapted to display an identifying indication characteristic of the particular emergency signal being received from that particular second transmitter said display being an indication of the need for assistance whereupon immediate aid can be dispatched from said central station.

4. An emergency assistance calling communications system comprising in combination:

a first radio transmitter of such proportions and configuration as to be concealable on one's person, and adapted to transmit a control signal and switch means coupled to said transmitter and adapted to be manually operative for actuating said first radio transmitter to transmit the control signal when an emergency threatens the one who maintains said transmitter on his person;

a first radio receiver adapted to be responsive to said first radio transmitter and including a switching circuit means therein adapted to be responsive to said control signal to produce a switching signal;

a second radio transmitter having therein a first source of modulating signals in the form of a speech modulator and a second source of modulating signals in the form of a predetermined code signal generator for identifying the particular second radio frequency transmitter by said predetermined code signal, and switching circuit means coupled to said second receiver and being responsive to said switching signal to transfer said second transmitter from said speech modulation source to said second source of modulating signals for transmitting a carrier signal modulated by said predetermined code signal; and a second radio receiver located in a central station and including therein a characteristic emergency warning indicator adapted to be responsive to said predetermined code signal modulating said second transmitter and being received by said second radio receiver said emergency warning indicator being further adapted to display an identifying indication characteristic of the particular predetermined code signal being received from that particular second transmitter said display being an identification of the particular second transmitter in need of assistance whereupon immediate aid can be dispatched from said central station.

5. An emergency assistance calling communications system comprising in combination:

a radio control transmitter of such proportions and configuration as to be concealable on one's person, said radio control transmitter including switch means coupled to said transmitter and adapted to be manually operative for actuating said radio control transmitter when an emergency threatens the one who maintains said transmitter on his person;

a first radio receiver adapted to be responsive to said radio control transmitter and including switching circuit means therein adapted to be actuated when signals are received from said radio control transmitter;

a communications radio transmitter having therein a first source of modulating signals in the form of a speech modulator and a second source of modulating signals in the form of a predetermined emergency signal generator for identifying the particular communications radio transmitter by said predetermined emergency signal, and switching circuit means coupled to said first radio receiver and being responsive to said switching circuit means in said first receiver to transfer said second transmitter from said speech modulation source to said source of emergency signals for transmitting a carrier signal modulated by said predetermined emergency signal; and a second radio receiver located in a central station and including therein a characteristic warning signal indicator adapted to be responsive to said predetermined emergency signals modulating said second transmitter and being received by said second radio receiver, said warning signal indicator being further adapted to display an identifying indication characteristic of the particular predetermined emergency signal being received from that particular communication transmitter, said display being an indication of the need for assistance and the location of the communication radio transmitter requiring the assistance, whereupon immediate aid can be dispatched from said central station.

6. An emergency assistance calling communication system comprising in combination:

a first radio transmitter of such proportions and configuration as to be concealable on one's person, said first transmitter including a frequency-controlled, radio-frequency signal generator, an audio-frequency signal generator, electric circuit means coupling said audio-frequency generator to said radio-frequency generator for modulation of said radio-frequency generator with audio frequency signals of predetermined character, and switch means coupled to said transmitter adapted to be manually operative for actuating said first radio transmitter when an emergency threatens the one who maintains said transmitter on his person;

a first radio receiver adapted to be responsive to said first radio transmitter and including circuit means therein adapted to receive and demodulate the modulated radio-frequency signals transmitted by said transmitter;

a second radio transmitter having therein a first source of modulating signals in the form of a speech modulator and a second source of modulating signals in the form of a predetermined recorded signal generator for identifying the particular second radio frequency transmitter by said predetermined recorded signal, and switching circuit means being responsive to said demodulated signals to transfer said second transmitter from said speech modulation source to said second source of modulating signals for transmitting a carrier signal modulated by said predetermined recorded signal; and a second radio receiver located in a central station and including therein a characteristic display indicator adapted to be responsive to said predetermined recorded signal modulating said second transmitter and being received by said second radio receiver said display indicator being further adapted to display an identifying indication characteristic of the particular predetermined recorded signal being received from that particular second transmitter said display being an indication of the need for assistance whereupon immediate aid can be dispatched from said central station.

7. An emergency assistance calling communications system comprising in combination:

a radio control signal transmitter of such proportions and configuration as to be concealable on one's person, and including switch means coupled to said transmitter and adapted to be manually operative for actuating said first radio transmitter to transmit the control signal when an emergency threatens the one who mainains said transmitter on his person;

a first radio receiver adapted to be responsive to said radio control signal transmitter and including circuit means therein adapted to be responsive to said control signal transmitted by said control signal transmitter to generate a switching signal;

a communications radio transmitter having therein a first source of modulating signals in the form of a speech modulator and a second source of modulating signals in the form of a predetermined emergency signal generator for identifying the particular communications radio transmitter by said predetermined emergency signal, and switching circuit means being responsive to said switching signal to transfer said communications radio transmitter from said speech modulation source to said source of emergency signals for transmitting a carrier signal modulated by said predetermined emergency signal; and a second radio receiver located in a central station and including therein a characteristic display indicator adapted to be responsive to said predetermined emergency signal to display an identifying indication characteristic of the particular predetermined emergency signal being received from that particular communication transmitter said display being an indication of the need for assistance whereupon immediate aid can be dispatched from said control station.

References Cited by the Examiner

UNITED STATES PATENTS

| | | | |
|---|---|---|---|
| 2,135,476 | 11/1938 | Rugh | 340—277 |
| 2,522,615 | 9/1950 | Hughes | 340—224 |
| 2,899,674 | 8/1959 | Sierer | 340—224 X |
| 2,979,706 | 4/1961 | Simon et al. | 340—224 |
| 3,207,850 | 9/1965 | Foreman | 340—224 X |

DAVID G. REDINBAUGH, *Primary Examiner.*

J. W. CALDWELL, *Assistant Examiner.*